(12) United States Patent
Tak

(10) Patent No.: US 8,111,364 B2
(45) Date of Patent: Feb. 7, 2012

(54) IN-PLANE SWITCHING MODE LIQUID CRYSTAL DISPLAY CAPABLE OF IMPROVING AN APERTURE RATIO AND FABRICATION METHOD THEREOF

(75) Inventor: Young-Mi Tak, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/025,731

(22) Filed: Feb. 11, 2011

(65) Prior Publication Data

US 2011/0134351 A1 Jun. 9, 2011

Related U.S. Application Data

(62) Division of application No. 11/639,323, filed on Dec. 15, 2006, now Pat. No. 7,907,245.

(30) Foreign Application Priority Data

Dec. 30, 2005 (KR) ................................ 136166/2005

(51) Int. Cl.
*G02F 1/1343* (2006.01)
(52) U.S. Cl. ....................................................... 349/141

(58) Field of Classification Search ................... 349/141
See application file for complete search history.

(56) References Cited

U.S. PATENT DOCUMENTS

| | | | |
|---|---|---|---|
| 6,512,565 B1 | 1/2003 | Lee et al. | |
| 2002/0063841 A1 | 5/2002 | Hirakata et al. | |
| 2002/0163604 A1* | 11/2002 | Kim et al. | 349/43 |
| 2004/0169780 A1 | 9/2004 | Kim et al. | |
| 2004/0212761 A1* | 10/2004 | Kadotani et al. | 349/110 |

* cited by examiner

*Primary Examiner* — Lauren Nguyen
(74) *Attorney, Agent, or Firm* — McKenna Long & Aldridge, LLP

(57) ABSTRACT

An in-plane switching (IPS) mode liquid crystal display (LCD) includes: a plurality of gate lines and data lines arranged vertically and horizontally to define a plurality of pixel regions on a first substrate; thin film transistors (TFTs) at each crossing of the gate and data lines and including an active layer, a source electrode and a drain electrode, respectively; a common electrode line substantially parallel to the gate lines; a plurality of first pixel electrodes and first common electrodes and a plurality of second pixel electrodes and second common electrodes having a tilt angle with respect to the gate lines and alternately disposed on upper and lower portions of the pixel regions to generate an in-plane electric field; and a second substrate attached with the first substrate.

4 Claims, 7 Drawing Sheets

IN-PLANE SWITCHING MODE LIQUID CRYSTAL DISPLAY CAPABLE OF IMPROVING AN APERTURE RATIO AND FABRICATION METHOD THEREOF

CROSS-REFERENCE TO RELATED APPLICATIONS

This application is a Divisional of application Ser. No. 11/639,323 filed Dec. 15, 2006 now U.S. Pat. No. 7,907,245, now allowed, which claims priority to Korean Patent Application No. 10-2005-0136166, filed Dec. 30, 2005, all of which are hereby incorporated by reference for all purposes as if fully set forth herein.

BACKGROUND OF THE INVENTION

1. Field of the Invention

The present invention relates to an in-plane switching (IPS) mode liquid crystal display (LCD) and its fabrication method.

2. Discussion of the Related Art

As users' interest in information displays grows and the demand for portable (mobile) information devices increases, research and commercialization of light thin flat panel displays (FPD), which can replace the CRT (Cathode Ray Tube), the existing display device, are actively ongoing.

Among FPDs, the LCD, a device for displaying images by using optical anisotropy of liquid crystal, exhibits excellent resolution and color and picture quality, so it is commonly used for notebook computers or desktop monitors and the like.

The LCD includes a color filter substrate, an array substrate, and a liquid crystal layer formed between the color filter substrate and the array substrate.

As switching elements of the LCD, generally, thin film transistors (TFTs) are used, and as a channel layer of the TFT, an amorphous silicon thin film is used.

The related art LCD will be described in detail with reference to FIG. 1.

FIG. 1 is an exploded perspective view showing the related art LCD.

As shown in FIG. 1, the LCD includes a color filter substrate 5, an array substrate 10 and a liquid crystal layer 30 formed between the color filter substrate 5 and the array substrate 10.

The color filter substrate 5 includes color filters (C) including a plurality of sub-color filters 7 implementing red, green and blue colors, black matrixes 6 for dividing the sub-color filters 7 and blocking light transmission to the liquid crystal layer 30, and a transparent common electrode 8 for applying voltage to the liquid crystal layer 30.

The array substrate 10 includes a plurality of gate lines 16 and a plurality of data lines 17 arranged horizontally and vertically to define a plurality of pixel regions (P), TFTs, the switching elements, formed at each crossing of the gate lines 16 and data lines 17, and pixel electrodes 18 formed on each pixel region (P).

The color filer substrate 5 and the array substrate 10 face each other and are attached by a sealant (not shown) formed on an outer edge of an image display region to form a liquid crystal display panel, and the two substrates 5 and 10 may be attached by an attachment key (not shown) formed on the color filter substrate 5 or on the array substrate 10.

As a driving method generally used for the LCD, a twisted nematic (TN) method for driving nematic liquid crystal molecules in a direction perpendicular to the substrates is used, which is, however disadvantageous in that its viewing angle is 90 degrees, namely, narrow. This results from refractive anisotropy of the liquid crystal molecules. Namely, when voltage is applied to the liquid crystal panel, the liquid crystal molecules aligned to be horizontal to the substrates are aligned in a direction almost perpendicular to the substrates.

SUMMARY OF THE INVENTION

Accordingly, the present invention is directed to an in-plane switching mode liquid crystal display and fabrication method thereof that substantially obviate one or more of the problems due to limitations and disadvantages of the related art.

An advantage of the present invention is to provide an IPS mode LCD capable of improving an aperture ratio and obtaining a sufficient attachment margin, and its fabrication method.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided an IPS mode LCD including: a plurality of gate lines and a plurality of data lines arranged vertically and horizontally to define a plurality of pixel regions on a first substrate; thin film transistors (TFTs) at each crossing of the gate lines and the data lines and including an active layer, a source electrode and a drain electrode, respectively; a common electrode line arranged substantially parallel to the gate lines; a plurality of first pixel electrodes and first common electrodes and a plurality of second pixel electrodes and second common electrodes having a tilt angle with respect to the gate lines and arranged in an alternating pattern on upper and lower portions of the pixel regions to generate an in-plane electric field; and a second substrate attached with the first substrate.

There is also provided a method for fabricating an IPS mode LCD including: forming a plurality of gate lines and data lines vertically and horizontally to define a plurality of pixel regions on a first substrate; forming TFTs having an active layer and source and drain electrodes at each crossing of the gate lines and the data lines; forming a common electrode line substantially parallel to the gate lines; forming a plurality of first pixel electrodes and first common electrodes and a plurality of second pixel electrodes and second common electrodes having a tilt angle with respect to the gate lines and arranged in an alternating pattern at upper and lower portions of the pixel regions to generate an in-plane electric field; and attaching the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

An in-plane switching (IPS) mode liquid crystal display (LCD) and its fabrication method according to exemplary embodiments of the present invention will be described with reference to the accompanying drawings.

Figure 1:
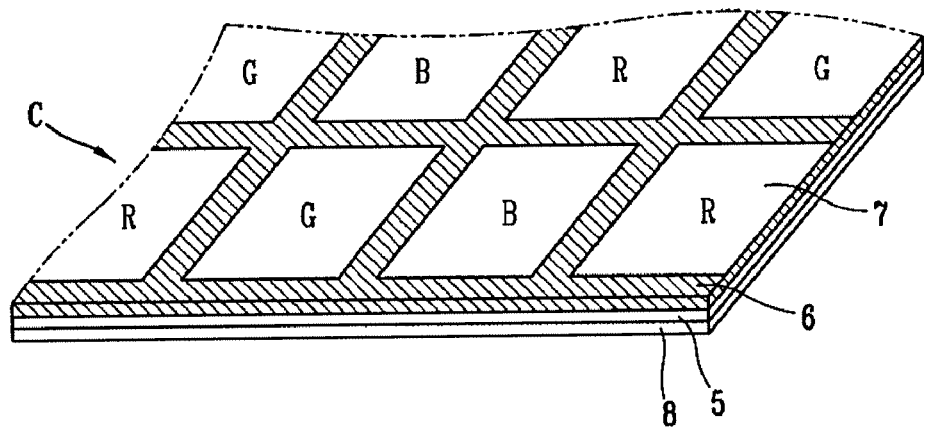
FIG. 1 is an exploded perspective view showing a related art liquid crystal display (LCD)
Figure 1:
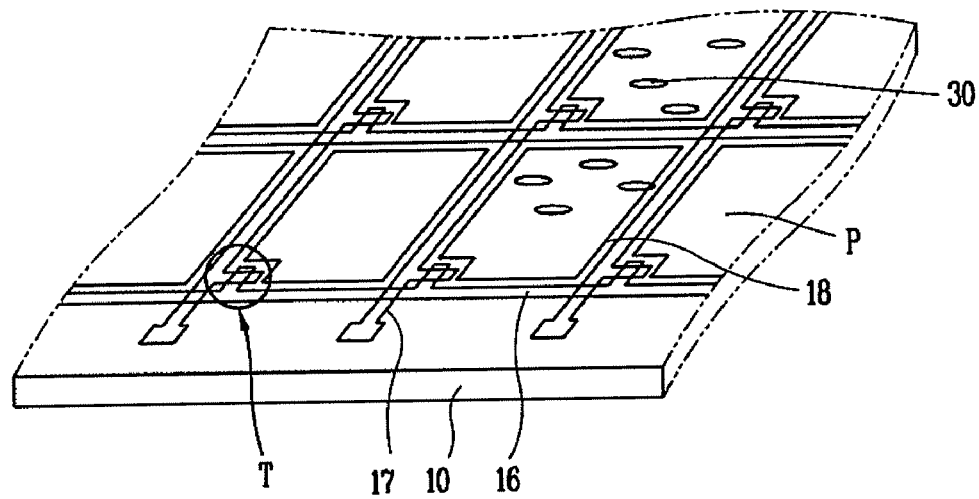
Figure 2:
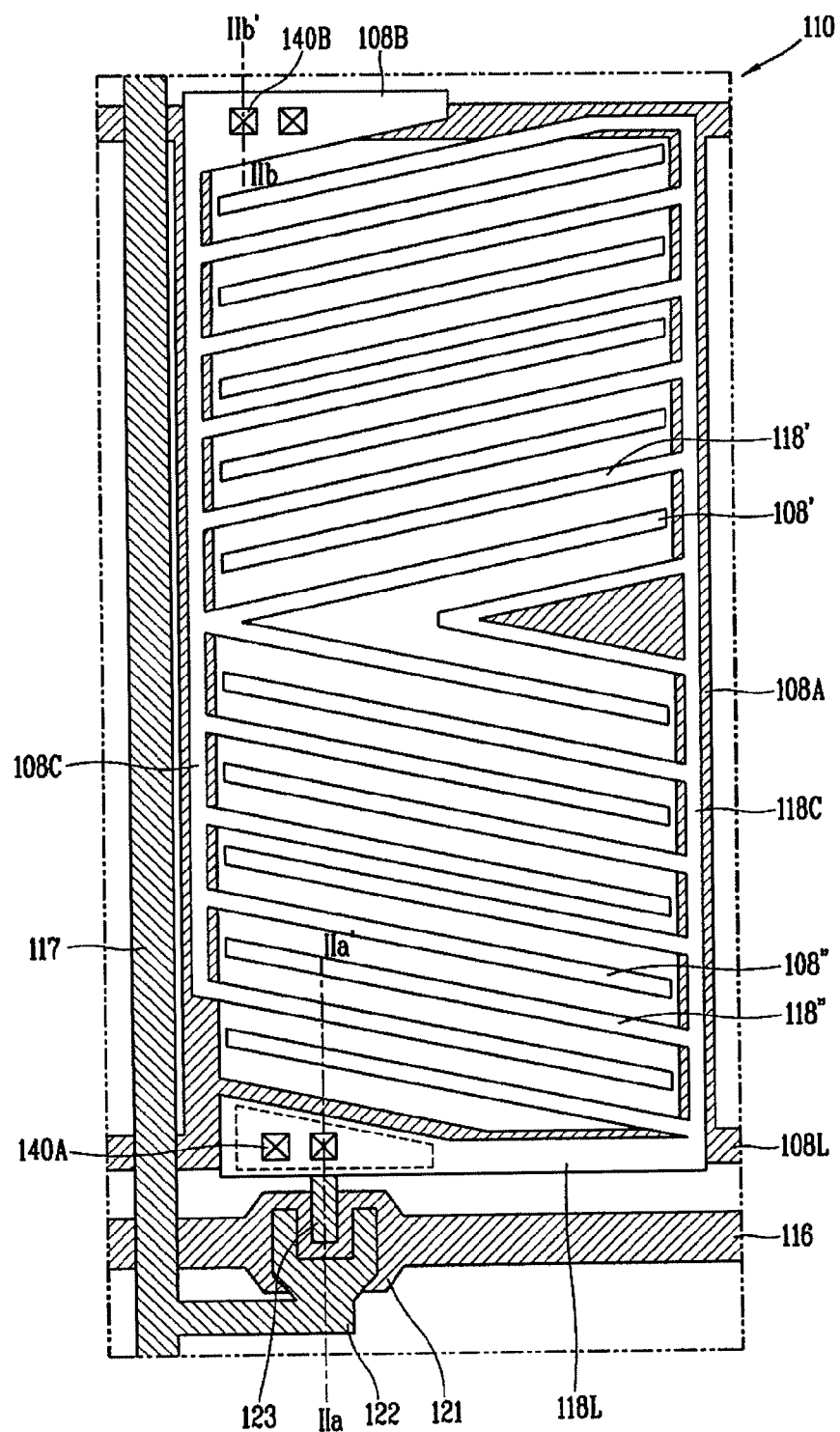
FIG. 2 is a plan view showing a portion of an array substrate according to a first embodiment of the present invention.
Figure 3:
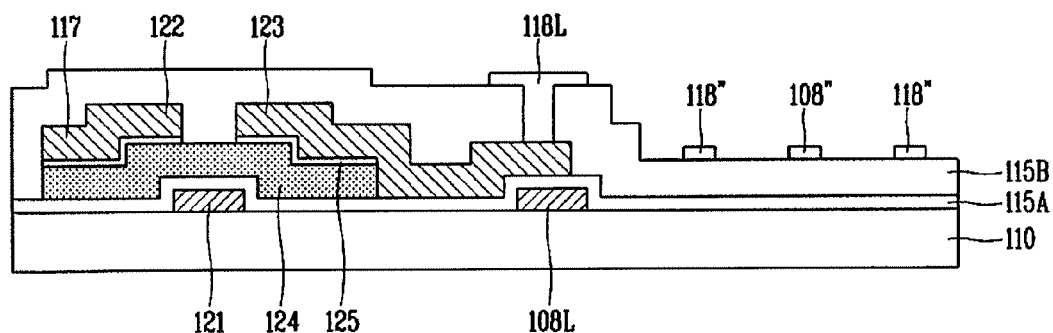
FIG. 3 is a sectional view taken along line IIa-IIa' of the array substrate of FIG. 2.
Figure 4:
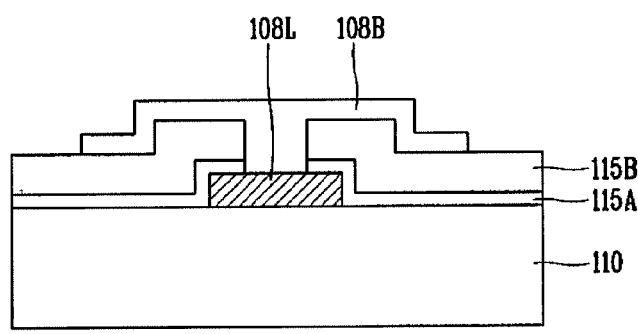
FIG. 4 is sectional view taken along line IIb-IIb' of the array substrate of FIG. 2.

FIG. 2 is a plan view showing a portion of an array substrate according to a first embodiment of the present invention, FIG. 3 is a sectional view taken along line IIa-IIa' of the array substrate of FIG. 2, and FIG. 4 is sectional view taken along line IIb-IIb' of the array substrate of FIG. 2.

The LCD according to the first embodiment of the present invention is an IPS mode LCD with an improved viewing angle by more than about 170° by driving liquid crystal molecules in a direction substantially horizontal to substrates. The actual LCD includes the M×N number of pixels as the N number of gate lines and the M number of data lines cross each other. A single pixel is shown in the drawing for the sake of brevity.

As shown, gate lines 116 and data lines 117 are arranged vertically and horizontally to define pixel regions on an array substrate 110, namely, a transparent glass substrate. Thin film transistors (TFTs), switching elements, are formed at each crossing of the gate lines 116 and the data lines 117.

Each TFT includes a gate electrode 121 formed as a portion of the gate line 116, a source electrode 122 connected with the data line 117, and a drain electrode 123 connected with pixel electrodes 118' and 118" via a pixel electrode line 118L. Each TFT also includes a first insulation film 115A for insulating the gate electrode 121 and the source/drain electrodes 122 and 123, and an active layer 124 for forming a conductive channel between the source and drain electrodes 122 and 123 by a gate voltage supplied to the gate electrode 121.

In each pixel region, common electrodes 108' and 108" and pixel electrodes 118' and 118" are alternately disposed to generate an in-plane electric field. The common electrodes 108' and 108" and the pixel electrodes 118' and 118" are made of a transparent conductive material such as indium tin oxide (ITO) or indium zinc oxide (IZO) and formed on the same plane.

The LCD according to the first embodiment of the present invention has such a double ITO structure that the common electrodes 108' and 108" and the pixel electrodes 118' and 118" are all made of the transparent conductive material in order to avoid a problem that when one internal electrode, namely, the common electrode or the pixel electrode is made of an opaque conductive material, a light leakage occurs at the electrode region, degrading a contrast ratio and creating a residual image due to an asymmetrical field.

The common electrodes 108' and 108" refer to the first common electrode 108' positioned at an upper portion of the pixel region and the second common electrode 108" positioned at a lower portion of the pixel region. The pixel electrode 118' and 118" refers to the first pixel electrode 118' positioned on the upper portion of the pixel region and alternately disposed with the first common electrode 108' and the second pixel electrode 118" positioned at the lower portion of the pixel region and alternately disposed with the second common electrode 108".

The pixel region is divided into the upper portion where the common electrodes 108' and 108" and the pixel electrodes 118' and 118" have a first tilt angle with respect to a rubbing direction and the lower portion where the common electrodes 108' and 108" and the pixel electrodes 118' and 118" have a second tilt angle with respect to the rubbing direction. In this case, the rubbing direction can be substantially parallel to the gate lines 116.

The common electrodes 108' and 108" and the pixel electrodes 118' and 118" are symmetrical to the rubbing direction. In this case, the first and second tilt angles are generally in the range of about 5° to 20°.

In this manner, in the LCD according to the present embodiment, because the common electrodes 108' and 108" and the pixel electrodes 118' and 118" are sloped to mutually different directions at the upper and lower portions of the pixel region, the pixel region is divided into the two domains to thereby improve the viewing angle.

The pixel electrodes 118' and 118" are connected with the pixel electrode line 118L so as to be electrically connected with the drain electrode 123 via a first contact hole 140A formed at the second insulation layer 115B, and the common electrodes 108' and 108" are connected with a common electrode pattern 108B so as to be electrically connected with the common electrode line 108L disposed to be substantially parallel to the gate line 116 via the second contact hole 140B formed at the first and second insulation layers 115A and 115B.

The pixel electrode line 118L and the first and second pixel electrodes 118' and 118" are connected by a first connection line 118C disposed to be substantially parallel to the data line 117, and the common electrode line 108L and the first and second common electrodes 108' and 108" are connected by a second connection line 108C disposed to be substantially parallel to the data line 117. The common electrode line 108L disposed at the upper and lower portions of the pixel region are connected by a branch 108A disposed to be substantially parallel to the data line 117.

The first connection line 118C adjacent to the data line 117 and the second connection line 108C can be changed according to an inversion driving method. For example, in case of double dot-inversion driving, a Cdp reduction designing is made, and in case of horizontal single dot-inversion driving, a Cdc reduction designing is made. Herein, the Cdp indicates capacitance between the data line 117 and the first connection line 118C, and the Cdc indicates capacitance between the data line 117 and the second connection line 108C.

Reference numeral 125 shows in FIG. 3 denotes an ohmic-contact layer for ohmic-contacting certain regions of the source and drain 122 and 123 and the active layer 124.

Figure 5:
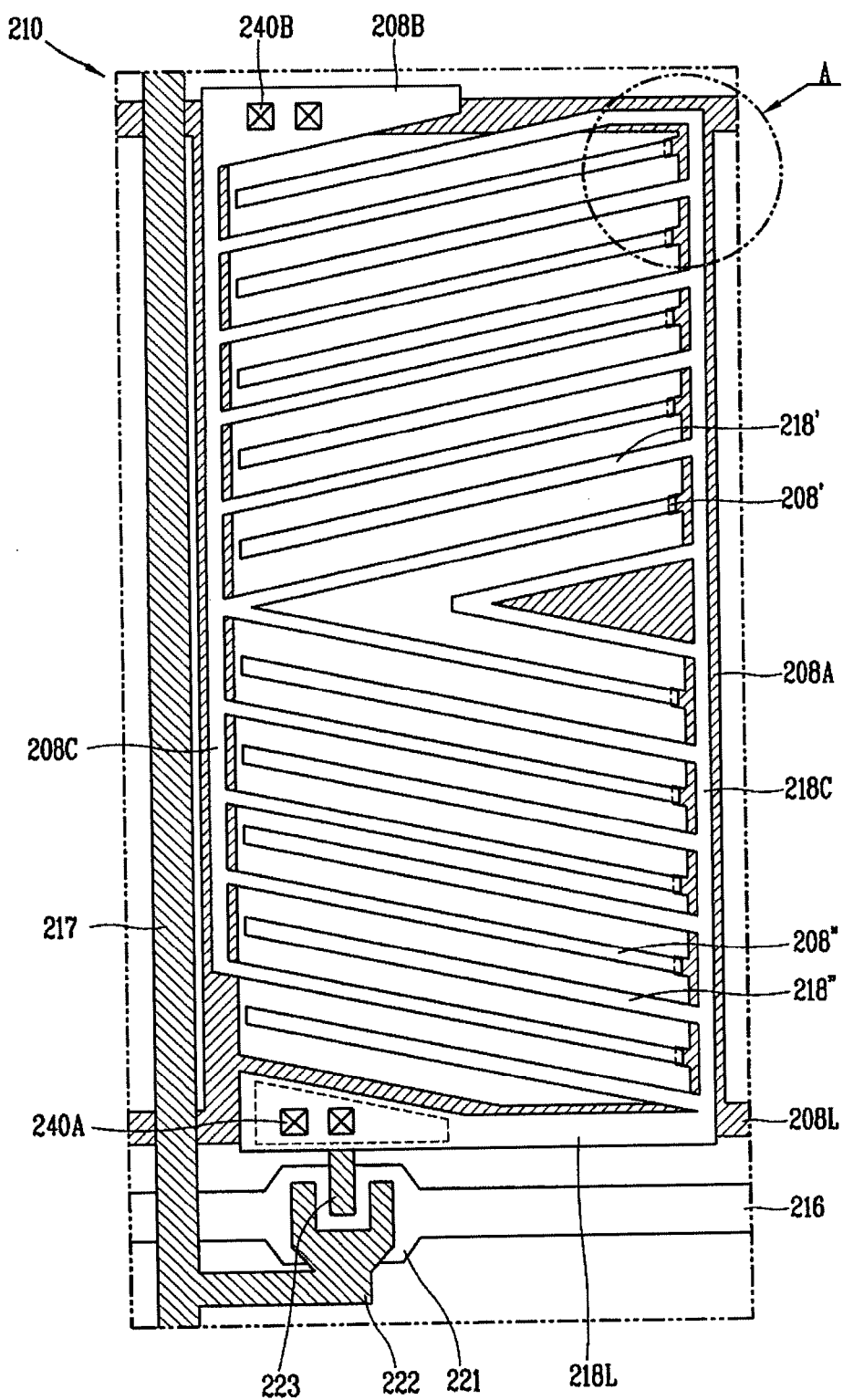
FIG. 5 is a plan view showing a portion of an array substrate according to a second embodiment of the present invention.
Figure 6:
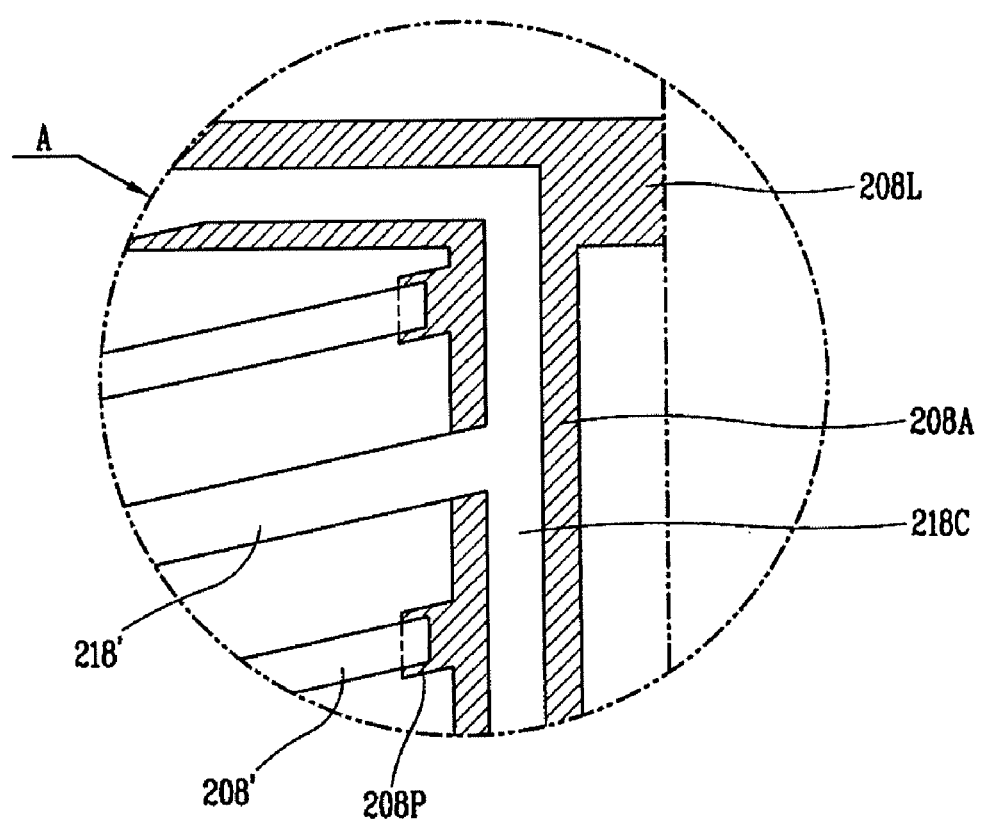
FIG. 6 is an enlarged view of a portion 'A' of the array substrate of FIG. 5.

FIG. 5 is a plan view showing a portion of an array substrate according to a second embodiment of the present invention, and FIG. 6 is an enlarged view of a portion 'A' of the array substrate of FIG. 5.

The array substrate according to the second embodiment of the present invention has the same structure as that of the first embodiment of the present invention, except that an end portion of the common electrode overlaps with a protruded region of the branch.

As shown, gate lines 216 and data lines 217 are arranged vertically and horizontally to define pixel regions on an array substrate 210, namely, a transparent glass substrate. Thin film transistors (TFTs), switching elements, are formed at each crossing of the gate lines 216 and the data lines 217.

Each TFT includes a gate electrode 221 formed as a portion of the gate line 216, a source electrode 222 connected with the data line 217, and a drain electrode 223 connected with pixel electrodes 218' and 218" via a pixel electrode line 218L. Each TFT also includes a first insulation film (not shown) for insulating the gate electrode 221 and the source/drain electrodes 222 and 223, and an active layer (not shown) for forming a conductive channel between the source and drain electrodes 222 and 223 by a gate voltage supplied to the gate electrode 221.

In each pixel region, common electrodes 208' and 208" and pixel electrodes 218' and 218" are alternately disposed to generate an in-plane electric field.

The common electrodes 208' and 208" refer to the first common electrode 208' positioned at an upper portion of the pixel region and the second common electrode 208" positioned at a lower portion of the pixel region. The pixel electrode 218' and 218" refers to the first pixel electrode 218' positioned on the upper portion of the pixel region and alternately disposed with the first common electrode 208' and the second pixel electrode 218" positioned at the lower portion of the pixel region and alternately disposed with the second common electrode 208".

The pixel electrodes 218' and 218" are connected with the pixel electrode line 218L so as to be electrically connected with the drain electrode 223 via a first contact hole 240A formed at the second insulation layer (not shown), and the common electrodes 208' and 208" are connected with a common electrode pattern 208B so as to be electrically connected with the common electrode line 208L disposed to be substantially parallel to the gate line 216 via the second contact hole 240B formed at the first and second insulation layers.

The pixel electrode line 218L and the first and second pixel electrodes 218' and 218" are connected by a first connection line 218C disposed to be substantially parallel to the data line 217, and the common electrode line 208L and the first and second common electrodes 208' and 208" are connected by a second connection line 208C disposed to be substantially parallel to the data line 217. The common electrode lines 208L disposed at the upper and lower portions of the pixel region are connected by a branch 208A disposed to be substantially parallel to the data line 217.

With reference to FIG. 6, in the LCD according to the second embodiment of the present invention, a certain region of the branch 208A forms a protrusion 208P that protrudes toward the common electrodes 208' and 208". End portions of the common electrodes 208' and 208" overlap with the protrusion 208P of the branch 208A to thus reduce a disclination region by about half compared with the related art LCD.

Figure 7:
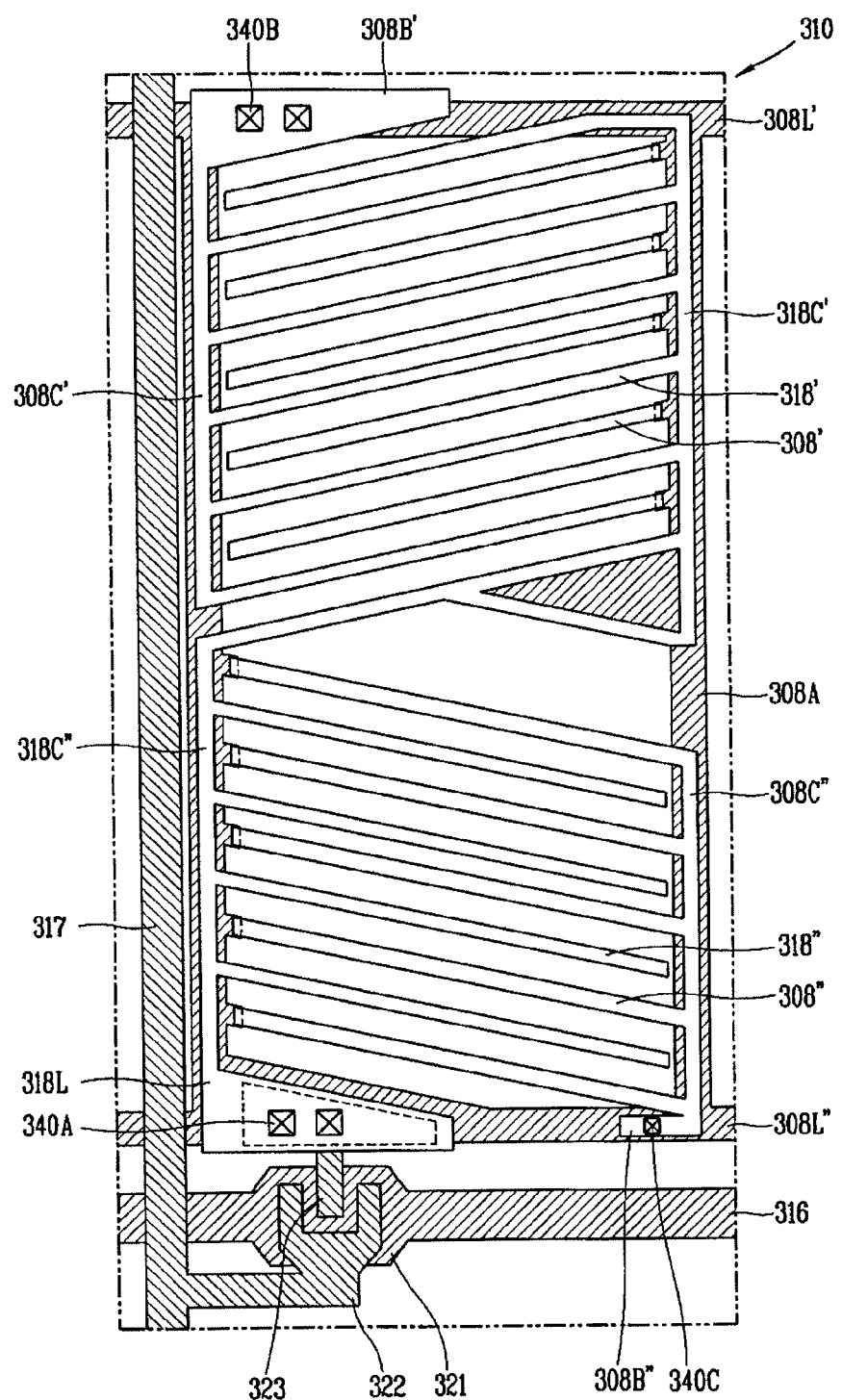
FIG. 7 is a plan view showing a portion of an array substrate according to a third embodiment of the present invention.

FIG. 7 is a plan view showing a portion of an array substrate according to a third embodiment of the present invention, in which Cpd exists at one side of a data line and Cdc exists at the other side of the data line.

The array substrate according to the third embodiment of the present invention has the structure as that of the second embodiment of the present invention except that an area where a disclination region is generated is distributed to left and right with respect to a single pixel region in order to minimize a change in luminance according to a defective attachment of the array substrate and a color filter substrate.

As shown, gate lines 316 and data lines 317 are formed to be arranged vertically and horizontally to define pixel regions on an array substrate 310, namely, a transparent glass substrate. Thin film transistors (TFTs), switching elements, are formed at each crossing of the gate lines 316 and the data lines 317.

Each TFT includes a gate electrode 321 formed as a portion of the gate line 316, a source electrode 322 connected with the data line 317, and a drain electrode 323 connected with pixel electrodes 318' and 318" via a pixel electrode line 318L. Each TFT also includes a first insulation film (not shown) for insulating the gate electrode 321 and the source/drain electrodes 322 and 323, and an active layer (not shown) for forming a conductive channel between the source and drain electrodes 322 and 323 by a gate voltage supplied to the gate electrode 321.

In each pixel region, common electrodes 308' and 308" and pixel electrodes 318' and 318" are alternately disposed to generate an in-plane field.

The common electrodes 308' and 308" refer to the first common electrode 308' positioned at an upper portion of the pixel region and the second common electrode 308" positioned at a lower portion of the pixel region. The pixel electrode 318' and 318" refers to the first pixel electrode 318' positioned on the upper portion of the pixel region and alternately disposed with the first common electrode 308' and the second pixel electrode 318" positioned at the lower portion of the pixel region and alternately disposed with the second common electrode 308".

In this case, the first and second common electrodes 308' and 308" each extend in a different direction, and the first and second pixel electrodes 318' and 318" also each extend in different directions.

The pixel electrodes 318' and 318" are connected with the pixel electrode line 318L so as to be electrically connected with the drain electrode 323 via a first contact hole 340A formed at the second insulation layer (not shown). The first common electrode 308' is connected with a first common electrode pattern 308B' so as to be electrically connected with the common electrode line 308L' positioned at an upper portion of the pixel region via the second contact hole 340B formed at the first and second insulation layers, and the second common electrode 308" is connected with the second common electrode pattern 308B" so as to be electrically connected with the second common electrode line 308L" positioned at a lower portion of the pixel region via a third contact hole 340C formed at the first and second insulation layers.

The pixel electrode line 318L and the first and second pixel electrodes 318' and 318" are connected by first connection lines 318C' and 318C", and the first common electrode line 308L', the first common electrode 308', the second common electrode line 308L" and the second common electrode 308" are connected by second connection lines 308C' and 308C". The common electrode lines 308L' and 308L" disposed at the upper and lower portions of the pixel region are connected by the branch 308A disposed to be substantially parallel to the data line 317.

In the third embodiment of the present invention, likewise as in the second embodiment, a certain region of the branch 308A forms a protrusion formed to be protruded toward the common electrodes 308' and 308". End portions of the common electrodes 308' and 308" overlap with the protrusion of the branch 308A to thus reduce a disclination region compared with the related art LCD. In addition, the overlap of the common electrodes 308' and 308" and the branch 308A is divided left and right of the pixel region with respect to the upper and lower portions of the pixel region. Thus, the disclination region of liquid crystal can be distributed in a left and right direction.

In the LCD according to the third embodiment of the present invention, Cdp exists at one side of the data line 317 and Cdc exists at the other side of the data line 317, so that the third contact hole 340C is additionally required compared with the first and second embodiments. However, a particular defect according to a driving method can be reduced and the disclination region can be distributed to left and right. With such effects, an amount of a luminance change generated in a defective attachment of the array substrate 310 and a color filter substrate (not shown) can be reduced.

Figure 8:
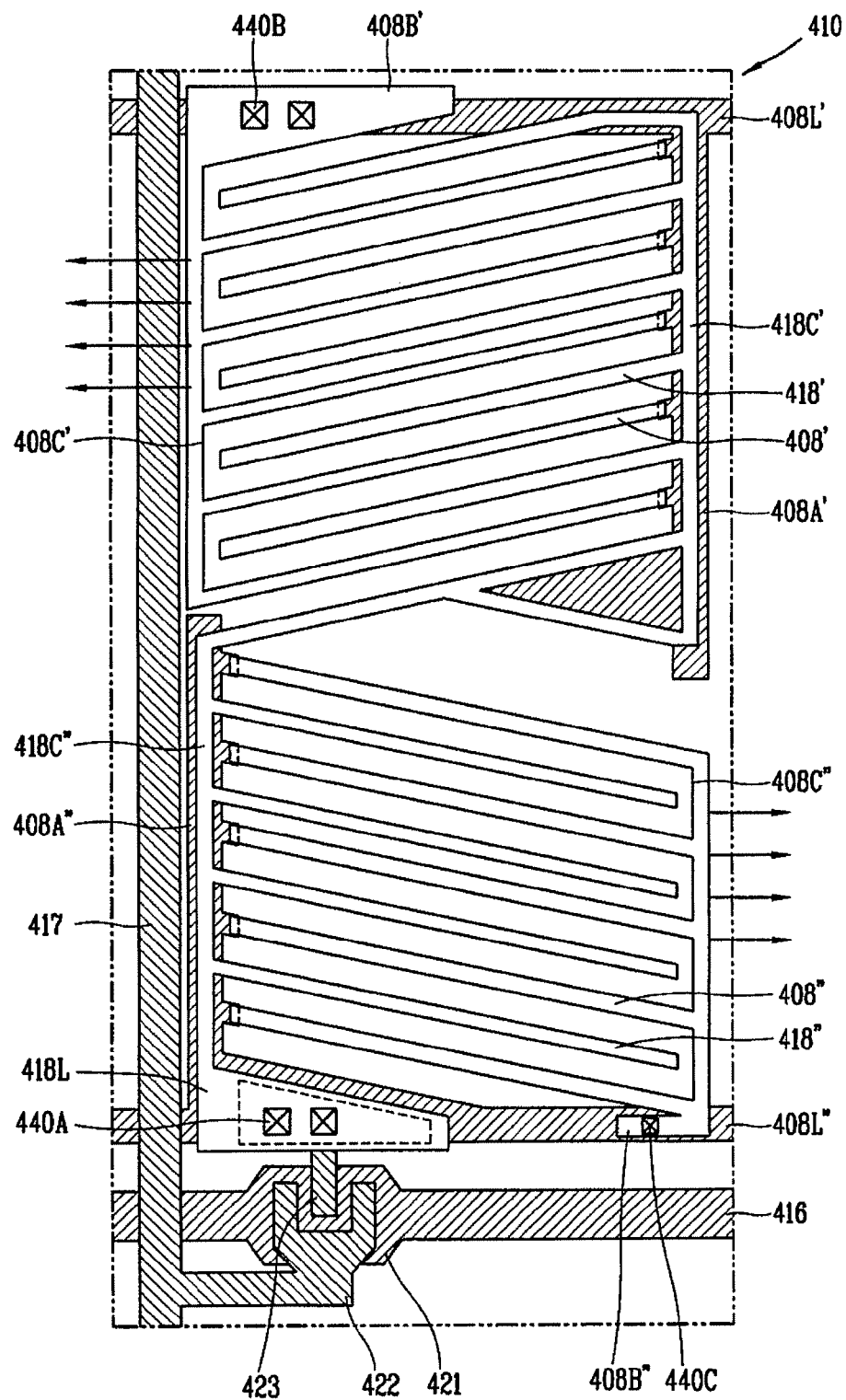
FIG. 8 is a plan view showing a portion of an array substrate according to a fourth embodiment of the present invention.

FIG. 8 is a plan view showing a portion of an array substrate according to a fourth embodiment of the present invention, having a structure that can improve an aperture ratio and reduce an attachment error margin.

In the array substrate according to the fourth embodiment of the present invention, the branch at the region where the second connection line and the branch overlap in the array substrate structure of the third embodiment of the present invention is removed and the second connection line is formed to be close to the data line.

As shown, gate lines 416 and data lines 417 are arranged vertically and horizontally to define pixel regions on an array substrate 410, namely, a transparent glass substrate. Thin film transistors (TFTs), switching elements, are formed at each crossing of the gate line 416 and the data line 417.

Each TFT includes a gate electrode 421 formed as a portion of the gate line 416, a source electrode 422 connected with the data line 417, and a drain electrode 423 connected with pixel electrodes 418' and 418" via a pixel electrode line 418L. Each TFT also includes a first insulation film (not shown) for insulating the gate electrode 421 and the source/drain electrodes 422 and 423, and an active layer (not shown) for forming a conductive channel between the source and drain electrodes 422 and 423 by a gate voltage supplied to the gate electrode 421.

In each pixel region, common electrodes 408' and 408" and pixel electrodes 418' and 418" are arranged in an alternating pattern to generate an in-plane electric field.

The common electrodes 408' and 408" refer to the first common electrode 408' positioned at an upper portion of the pixel region and the second common electrode 408" positioned at a lower portion of the pixel region. The pixel electrode 418' and 418" refers to the first pixel electrode 418' positioned on the upper portion of the pixel region and alternately disposed with the first common electrode 408' and the second pixel electrode 418" positioned at the lower portion of the pixel region and alternately disposed with the second common electrode 408".

In this embodiment, the first and second common electrodes 408' and 408" each extend in a different direction, and the first and second pixel electrodes 418' and 418" also each extend in a different direction.

The pixel electrodes 418' and 418" are connected with the pixel electrode line 418L so as to be electrically connected with the drain electrode 423 via a first contact hole 440A formed at the second insulation layer (not shown). The first common electrode 408' is connected with a first common electrode pattern 408B' so as to be electrically connected with the common electrode line 408L' positioned at an upper portion of the pixel region via the second contact hole 440B formed at the first and second insulation layers, and the second common electrode 408" is connected with the second common electrode pattern 408B" so as to be electrically connected with the second common electrode line 408L" positioned at a lower portion of the pixel region via a third contact hole 440C formed at the first and second insulation layers.

The pixel electrode line 418L and the first and second pixel electrodes 418' and 418" are connected by first connection lines 418C' and 418C", and the first common electrode line 408L', the first common electrode 408', the second common electrode line 408L" and the second common electrode 408" are connected by second connection lines 408C' and 408C". The first common electrode line 408L disposed at the upper portion of the pixel region is connected with a first branch 408A' disposed to be substantially parallel to the data line 417 and the second common electrode line 408L" disposed at the lower portion of the pixel region is connected with a second branch 408A" disposed to be substantially parallel to the data line 417.

In the fourth embodiment of the present invention, likewise as in the third embodiment, a certain region of the first branch 408A' protrudes toward the first common electrodes 408'. An end portion of the first common electrode 408' overlaps with the protrusion of the first branch 408A'. Also, a certain region of the second branch 408A" protrudes toward the second common electrodes 408". And, an end portion of the second common electrode 408" overlaps with the protrusion of the second branch 408A", to thus reduce a disclination region compared with the related art LCD.

In addition, the overlap of the first common electrode 408' and the first branch 408A' and the overlap of the second common electrode 408" and the second branch 408A" are divided in a left and right with respect to the upper and lower portions of the pixel region. Thus, the disclination region of a liquid crystal can be distributed in a left and right direction.

In the LCD according to the fourth embodiment of the present invention, the branches 408A' and 408A" at the portions where they overlap with the second connection lines 408C' and 408C" in the pixel region are removed and the second connection lines 408C' and 408C" are formed to be substantially close to the data line 417, thereby improving an aperture ratio of the LCD and obtaining an attachment margin of the array substrate 410 and a color filter substrate (not shown).

In this case, the first branch 408A' and the second branch 408A" can be connected at the center of the pixel region.

The array substrates of the first to fourth embodiments of the present invention are attached with color filter substrates in a facing manner by a sealant formed at an outer edge of image display regions to form a liquid crystal display panel. The array substrates and the color filter substrates may be attached through an attachment key formed on the array substrates and the color filter substrates.

In the first to fourth embodiments of the present invention, an amorphous silicon TFT is used as the switching element, but the present invention is not limited thereto and a polycrystalline silicon TFT may be also used as the switching element.

In addition, the present invention can be also applied to any other display devices that are fabricated by using the TFT, for example, an organic light emitting diode display device in which organic light emitting diodes are connected with driving transistors, as well as for the LCD.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating an in-plane switching (IPS) mode liquid crystal (LCD) device comprising:
   forming a plurality of gate lines and data lines vertically and horizontally to define a plurality of pixel regions on a first substrate;
   forming thin film transistors (TFTs) having an active layer and source and drain electrodes at each crossing of the gate lines and the data lines;
   forming a plurality of common electrode lines substantially parallel to the gate lines,
   wherein the common electrode lines are formed at upper and lower portions of the pixel region;
   forming a plurality of first pixel electrodes and first common electrodes and a plurality of second pixel electrodes and second common electrodes having a tilt angle with respect to the gate lines and arranged in an alternating pattern on upper and lower portions of the pixel regions to generate an in-plane electric field;
   attaching the first and second substrates together;
   forming a branch substantially parallel to the data lines and connecting the upper and lower common electrode lines,
   wherein the branch includes a protrusion protruding toward the first or second common electrode and the protrusion of the branch overlaps with an end portion of the first or second common electrodes, and
   wherein the overlap between the branch and the first or second common electrodes occurs in an area left and right with respect to the upper and lower portions of the pixel region;
   forming a pixel electrode line electrically connected with the drain electrode line via a first contact hole; and
   forming a first connecting line that connects the pixel electrode line and the first and second pixel electrodes and a second connection line that connects the plurality of common electrode lines and the first and second common electrodes,
   wherein the first and second connection lines overlap with the branches, respectively.

2. The method of claim 1, further comprising:
   forming a first branch substantially parallel to the data lines and connected with the first common electrode line; and
   forming a second branch substantially parallel to the data lines and connected with the second common electrode line.

3. The method of claim 2, wherein the first branch comprises a first protrusion protruding toward the first common electrode and the first protrusion of the first branch overlaps with an end portion of the first common electrode.

4. The method of claim 2, wherein the second branch comprises a second protrusion protruding toward the second common electrode and the second protrusion of the second branch overlaps with an end portion of the second common electrode.

* * * * *